Jan. 3, 1950 W. WAGNER 2,493,513
GASKET CUTTER
Filed April 1, 1949
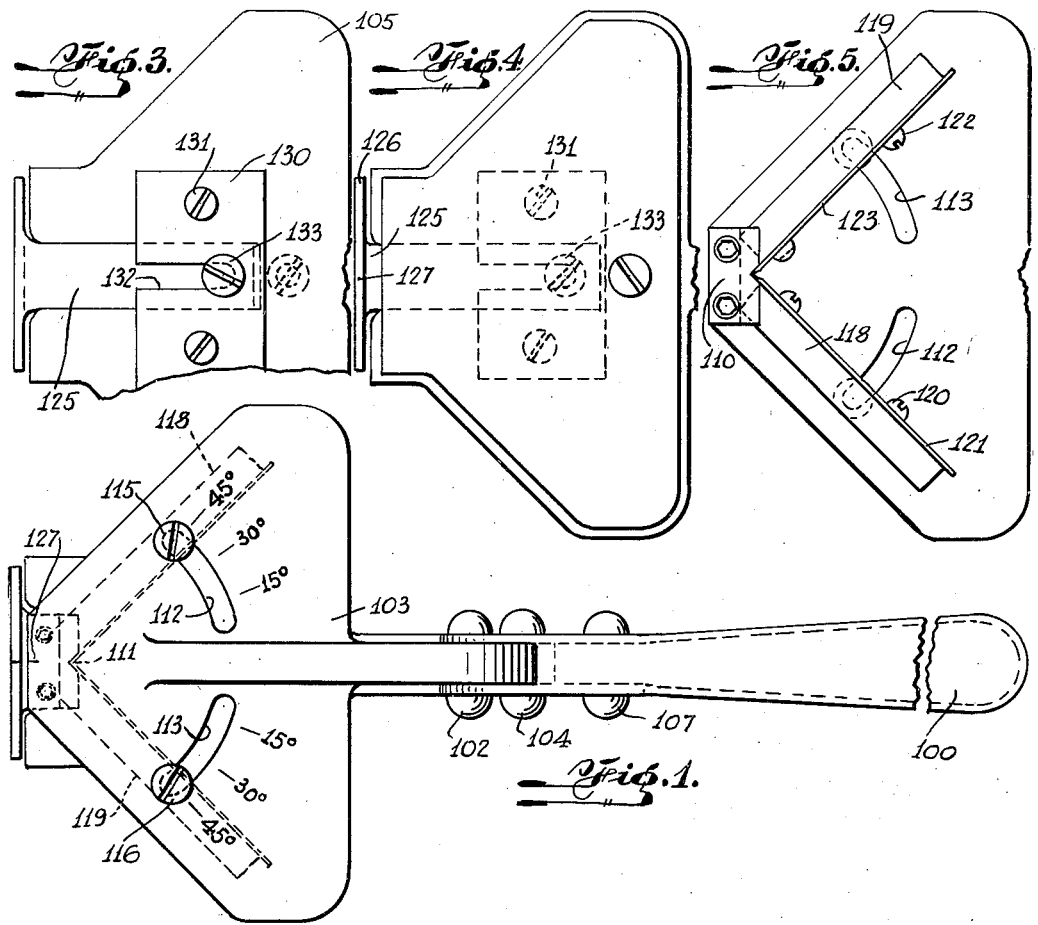
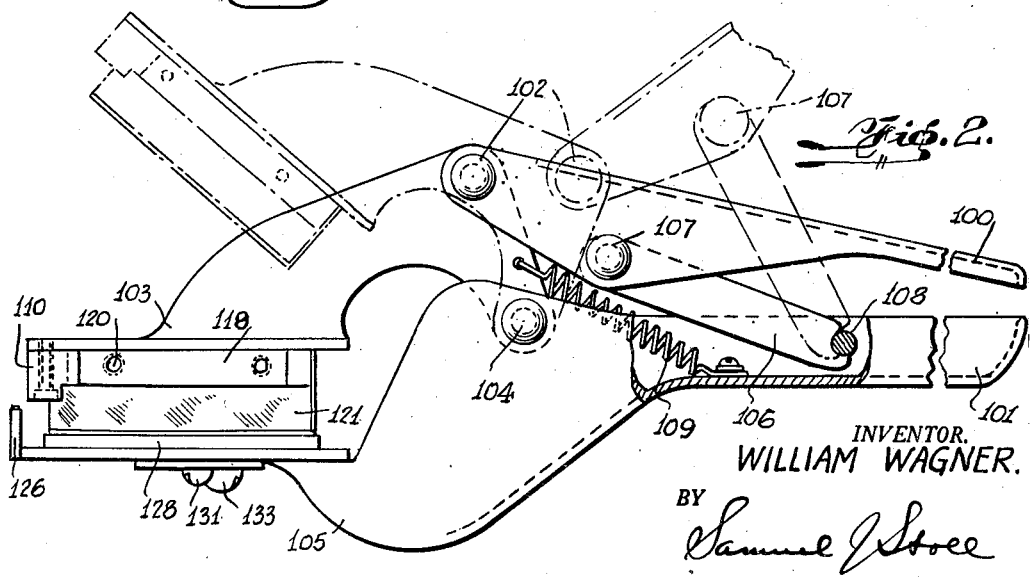
INVENTOR.
WILLIAM WAGNER.
BY
Samuel J Stoll
ATTORNEY.

Patented Jan. 3, 1950

2,493,513

UNITED STATES PATENT OFFICE 2,493,513

GASKET CUTTER

William Wagner, Brooklyn, N. Y.

Application April 1, 1949, Serial No. 84,796

4 Claims. (Cl. 30—178)

This invention relates to a notch cutter for gaskets of refrigerator doors and the like.

Refrigerator door gaskets are manufactured in continuous strips or lengths which must be cut to appropriate size to fit the doors of the many different makes, sizes and styles of refrigerators now on the market. They must also be notched at appropriate points for the purpose of forming corners and also for the purpose of enabling the gaskets to follow the contours of doors with curved sides or edges. A 90° corner requires a 90° notch in the gasket and a gentle curve necessitates the formation of a plurality of acute angle notches in the gasket. The problem of providing suitable notches, accurately spaced and precisely placed is not very serious in the plants where refrigerators are made, since in long production runs of gaskets for a given size and type of refrigerator prefabrication or pre-notching is the keynote. The problem does attain substantial proportions however, when the repairman or serviceman in the refrigeration field is called upon to substitute a replacement gasket for the one with which the refrigerator was originally equipped. The serviceman has to contend with a great many makes and sizes and types of refrigerators. He must also contend with many types of gaskets. And his problem is to incorporate the proper type of notch in the right place in each individual case.

It is clear therefore that servicemen have had to take time consuming measurements and that they have also had to engage in considerable guesswork in order to fit a given gasket to a given refrigerator door. They have had to lay out each gasket for pre-notching before mounting the gasket on the refrigerator door. Improvised tools have been devised for assisting in this work but these tools have invariably been awkward to use and their accuracy has been considerably less than desired and required. In short, no gasket notcher has heretofore been devised which is adapted to cut a notch of suitable size in precisely the right place and in accurate angular alignment. Efforts have also been made to notch the gasket during the process of mounting it on the door so that each notch would be cut as its appropriate location is reached. Satisfactory notching means have not however heretofore been devised for doing this kind of work and although this would be the ideal method of affixing a replacement gasket to a refrigerator door, the method has not heretofore been in wide use for want of a suitable tool to notch the gasket directly on the refrigerator door.

It is the principal object of this invention to provide a gasket notcher which may be applied to a gasket during the course of the process of affixing it to a refrigerator door. The gasket notcher of the present invention functions in the manner of a pair of cutting pliers or nippers. It may be held in one hand precisely as a pair of pliers is held and it may be used very conveniently in the precise location where a corner or notch is required.

Another object of this invention is the provision of a notch cutter of the character described which includes gasket aligning means for precisely aligning the gasket with respect to the cutter. A guide is provided for the gasket which positions the gasket on a line to which the cutter is perpendicular. An indicator is provided to accurately align the cutter with respect to that point on the gasket which is to coincide with the corner of the door.

Still another object of this invention is the provision of a gasket notcher of the character described wherein the cutter is adjustable for cutting notches of different sizes. In the preferred form of this adjustable notcher, the cutter is adjustable from an angle of 90° to an angle of 25° or less. It will become apparent from a reading of this specification that the cutter comprises a pair of blades which are independently movable. A single screw positions each blade. It is therefore possible, for this type of gasket notcher, to cut an asymmetrical notch, that is a notch whose edges are inclined at different angles with respect to the longitudinal axis of the gasket.

Still another object of this invention is the provision of an adjustable gasket notcher of the character described whose gasket guide is adjustable with respect to the cutter. A single screw positions said guide and by loosening and tightening said screw, the guide may be moved toward or away from the cutter. This adjustment feature is valuable for determining and controlling the depth of the cut or notch in the gasket and it is useful in connection with gaskets of different widths.

A further object of this invention is the provision of a gasket notcher of the character described wherein the cutter co-acts with an anvil which is made of softer material than the cutter and which is replaceable at will. The cutter is made of hardened steel and the anvil is made of a relatively soft material such as pressed wood, which is held in place by a single screw. The cutter cuts grooves into the anvil and its cutting action with respect to the gasket is thereby enhanced.

The invention herein claimed has thus far been described in terms of its application to a refrigerator door gasket. This, however, should be taken as illustrative of the many functions and purposes of the present invention. The invention is well adapted for other applications but for purposes of convenience and clarity, the specification will be limited to its use in connection with gaskets for refrigerator doors.

Preferred forms of this invention are shown in the accompanying drawing in which:

Fig. 1 is a top view of a gasket notcher made in accordance with the present invention, wherein the cutter is adjustable for cutting notches of different angles and wherein the gasket guide is adjustable for cutting notches of different depths;

Fig. 2 is an enlarged side view thereof showing the closed position of the notcher in solid lines and showing its open position in broken lines;

Fig. 3 is a fragmentary view of the lower jaw of the notcher which carries the anvil, said view looking upwardly at said lower jaw;

Fig. 4 is a similar view looking downwardly upon said lower jaw and more especially upon its anvil;

Fig. 5 is a view looking upwardly at the upper jaw of the notcher, showing the cutter mounted thereon.

The adjustable notch cutter shown in the drawing has an upper handle 100 and a lower handle 101. Upper handle 100 is pivotally connected by means of rivet 102 to upper jaw 103. Upper jaw 103 is also pivotally connected by means of rivet 104 to lower handle 101 and said lower handle extends forwardly past rivet 104 to form lower jaw 105. A toggle link 106 is pivotally connected by means of rivet 107 to upper handle 100 and by means of rivet 108 to the lower handle 101. It will clearly be seen in Fig. 2 that toggle link 106 is permanently connected to rivet 107 but it is only detachably connected to link 108. Link 106 may be detached from rivet 108 when it is desired to open the tool as wide as possible for the purpose of replacing some of its parts. Tension spring 109 is connected at one end to handle 101 and at its opposite end to upper jaw 103, between rivets 102 and 104. It will be seen from the foregoing that a toggle connection is provided between the lower handle and jaw on the one hand and the upper handle and upper jaw on the other hand. The toggle action to close the jaws is opposed by spring 109, since the tendency of said spring is to urge the two jaws into open position relative to each other. The drawing illustrates but one type of pliers action and it will be understood that other types are equally available and useful for the purposes of the present invention.

Upper jaw 103 is substantially triangular in shape. At its forward end, it is provided with a block 110 having a V-shaped notch 111 formed therein in line with the longitudinal axis of the tool. The upper jaw also has a pair of arcuate slots 112 and 113 formed therein, said slots being situated on a circular line which is equidistant at all points from the vertex of notch 111. Riding in slots 112 and 113 is a pair of screws 115 and 116, respectively, which are attached to blocks 118 and 119, respectively. Fastened to block 118 by means of screws 120 is a cutting blade 121 and fastened to block 119 by means of screws 122 is a blade 123. The blades meet at the vertex of notch 111 in block 110 and said vertex serves as a fulcrum for said blades when they engage in angular movement as will shortly appear. Blocks 118 and 119 are adapted to move integrally with their respective blades. Since screws 115 and 116 engage said blocks through slots 112 and 113, and since the blades are in engagement with each other in the vertex of notch 111, said blocks are movable arcuately only, to the extent that the slots will permit such movement. When the blocks, and hence the cutting blades, are as far apart from each other as the slots will permit, a 90° angle separates them. When they are as close together as said slots will permit, an acute angle of less than 30° separates them.

It will be seen from the foregoing that blades 121 and 123 of the tool now under discussion are adjustable with respect to each other so that they may be used to cut a notch in the gasket to any angular width from less than 30° to 90°. Fig. 1 shows that slots 112 and 113 are calibrated so that blocks 118 and 119 and hence cutting blades 121 and 123 may be set at any angular position relative to each other. When said blocks and blades are set properly, screws 115 and 116 are tightened to prevent accidental displacement of said blocks and blades. To readjust and reset them, said screws are loosened and the blocks and blades are moved either toward or away from each other, as desired. The screws are then once again tightened and the tool is once again ready for use.

Lower jaw 105 has an anvil 128 which is made of relatively soft material, such as pressed wood or plastics and it has a slidably mounted extension piece 125 with an upwardly extending flange or guide wall 126. A centrally disposed indicator 127 is formed or marked on said guide wall 126. Extension piece 125 is supported by means of a plate 130, which is affixed by means of screws 131 to the bottom of lower jaw 105. Plate 130 has a slot 132 formed therein, longitudinally of the tool. A screw 133 engages extension piece 125 through said slot 132. When screw 133 is loosened, extension piece 125 may be moved outwardly or inwardly, as desired, to provide greater or lesser clearance between guide wall 126 and the point where blades 121 and 123 meet. In this manner, control may be had of the depth of the gasket notch which the tool cuts.

The foregoing is descriptive of a preferred form of the present invention. This preferred form may be varied or modified in different ways within the scope of the present invention and other forms of the invention may also be had within its broad scope and spirit.

I claim:

1. A notch cutter for gaskets and the like, said notch cutter comprising a pair of co-acting, pivotally connected handles, a pair of co-acting jaws on said handles, a pair of cutting blades adjustably mounted on one of said jaws in V-relationship toward each other, said blades being movable toward and away from each other to vary the angular distance between them, an anvil for said blades on the other of said jaws and guiding means for locating the gasket on the anvil relative to said blades.

2. A notch cutter for gaskets and the like, said notch cutter comprising a pair of co-acting, pivotally connected handles, a pair of co-acting jaws on said handles, a pair of cutting blades adjustably mounted on one of said jaws in V-relationship toward each other, said blades being movable toward and away from each other to vary the angular distance between them, an anvil for said blades on the other of said jaws and guiding means for locating the gasket on the anvil relative to said blades, said guiding means being adjustably positioned on said other jaw for movement toward and away from the blades to control the depth of the notch in the gasket.

3. A notch cutter for gaskets and the like, said notch cutter comprising a pair of co-acting, pivotally connected handles, a pair of co-acting jaws on said handles, a V-shaped cutter mounted on one of said jaws, said cutter being adjustable to vary the angular distance between the two arms of the V, an anvil for said cutter on the other of said jaws, and guiding means for locating the gasket on the anvil relative to said cutter.

4. A notch cutter for gaskets and the like, comprising a pair of co-acting, pivotally connected handles, a pair of co-acting jaws on said handles, a V-shaped cutter mounted on one of said jaws, said cutter comprising a pair of cutting arms which are movable toward and away from each other about the vortex of the V, a pair of adjusting screws connected to said cutting arms for adjusting their relative angular positions, an anvil for said cutter on the other of said jaws, an adjustable guide wall mounted on said other jaw, and an adjusting screw for adjusting the position of said guide wall relative to said cutter.

WILLIAM WAGNER.

REFERENCES CITED

The following references are of record in the file of this patent:

UNITED STATES PATENTS

| Number | Name | Date |
|---|---|---|
| 58,183 | Whitlock | Sept. 18, 1866 |
| 114,674 | Griffith | May 9, 1871 |
| 151,711 | Morgan et al. | June 9, 1874 |
| 573,110 | Shannon | Dec. 15, 1896 |
| 854,297 | Limacher | May 21, 1907 |
| 2,224,226 | Jensen | Dec. 10, 1940 |

FOREIGN PATENTS

| Number | Country | Date |
|---|---|---|
| 232,908 | Switzerland | Sept. 16, 1944 |